INVENTOR.
ELDON L. GRIMES
BY
ATTORNEYS

Aug. 6, 1968    E. L. GRIMES    3,395,549
PROCESS AND APPARATUS FOR QUICK FREEZING OF FOOD BODIES
Filed Nov. 16, 1966    2 Sheets-Sheet 2

INVENTOR.
ELDON L. GRIMES
BY
Christensen, Sanborn & Matthews
ATTORNEYS

United States Patent Office 3,395,549
Patented Aug. 6, 1968

3,395,549
PROCESS AND APPARATUS FOR QUICK
FREEZING OF FOOD BODIES
Eldon L. Grimes, Seattle, Wash., assignor to Marine Construction & Design Co., Seattle, Wash., a corporation of Washington
Filed Nov. 16, 1966, Ser. No. 594,711
11 Claims. (Cl. 62—63)

ABSTRACT OF THE DISCLOSURE

Shrimp or other food bodies to be frozen are immersed in a shallow bath of chilled liquid coolant confined in the lower peripheral portion of a revolving drum. The drum is inclined at a small angle to the horizontal to effect gravity flow of the shrimp progressively from one end to the other. A spiral feed element mounted on the drum's interior wall assures more positively controlled advance of the shrimp along the drum in shipboard applications wherein inclination of the drum may vary with motion of the vessel. The drum wall has a large number of drain openings for continuous rapid discharge of coolant from the bath at locations distributed throughout the extent thereof. Coolant draining from the drum and rechilled to predetermined temperature is jetted forcibly against the surface of the bath at a large number of locations distributed over the area thereof. Total flow from the jets is adequate to maintain the level of coolant in the drum slightly greater than that necessary to immerse the shrimp. The force of such jets causes resubmersion of surfacing shrimp, helps insure generally uniform leveling or distribution of shrimp throughout the bath, and produces vigorous continuous flow of coolant past the shrimp. A processing environment is created in which the shrimp are uniformly frozen in a minimum time period so as to permit achieving maximum production rates in a continuous flow system.

Background of invention

This invention relates to an improved continuous flow system for quick freezing of shrimp, anchovies, and other food bodies using chilled brine or other coolant liquid. A broad object hereof is to achieve efficient rapid production of the frozen product with more reliable uniformity and a greater degree of control in the freezing operation than with prior systems. The novel process and apparatus of the invention are herein illustratively described by reference to the presently preferred embodiment thereof suitable for freezing of shrimp aboard a trawler, for example; however, it will be recognized that certain modifications and changes therein with respect to details may be made without departing from the essential features involved.

A principal difficulty with prior art quick freeze systems of the liquid immersion type was the unpredictable variation in degree of freezing of individual food bodies and parts of food bodies, particularly when attempting to increase production rates by minimizing dwell time in the coolant bath. This difficulty stemmed from a basic inability to maintain coolant temperature completely uniform throughout the bath and provide continuous exposure to that temperature of all individual shrimp during the entire freezing cycle. Consequently, freezing of all shrimp to a uniform state of preservation could only be assured by inefficient prolongation of processing time.

Efforts to solve these difficulties by increasing coolant circulation rates within the bath were only partially successful because of the tendency of individual shrimp to remain with local pockets or bodies of coolant and thus raise the temperature of such coolant locally. This temperature rise tended to vary throughout the bath, depending upon density distribution of the shrimp therein, flow pattern and differences in initial body temperatures and thermal capacities of individuals. Moreover, the problem of some individuals freezing at different rates than others was aggravated by the tendency of shrimp and similar lightweight food bodies to surface for uncontrolled and varying periods due to buoyancy, uneven distribution in the bath, or passage through regions of upwelling currents.

Efforts to solve the described problem by expanding the size of the vat and thus provide a relatively larger heat sink were only partially effective for the reasons mentioned above. The greater complexity, bulk and cost of apparatsu entailed in these attempts more than offset any gains in effectiveness.

Similar inefficiencies have limited the usefulness of prior art quick freeze systems of the type in which shrimp are sprayed with liquid coolant during passage on a conveyor. This approach had the advantage of permitting a relatively large volume of coolant to be maintained at control temperature in a reservoir, so that the brine sprayed against the shrimp was largely at constant temperature. However, to achieve even approximately uniform treatment great care was required to distribute and maintain the shrimp spread uniformly on the conveyor and to expose all individuals equally to the spray. Air freezing on conveyors represented an even slower process and entailed additional handling problems arising from the tendency of the shrimp in the frozen state to stick together or to the conveyor surface.

A specific object of this invention is to provide an improved process and apparatus which combines the favorable attributes of the prior art systems without the aforementioned shortcomings and limitations thereof. It is thereby an object hereof to provide a method and apparatus for quick freezing of food bodies which will be relatively simple, compact and inexpensive. A related object is to achieve such a method and apparatus which is suitable for operation under field conditions, such as aboard a shrimp trawler or anchovy seiner, and by relatively inexperienced personnel.

A further object of this invention is to provide a system for quick freezing of shrimp and other food bodies in brine or equivalent liquid coolant which subjects all individuals to a freezing cycle of minimum duration by assuring their total effective immersion in coolant liquid throughout the cycle and by so continuously and vigorously circulating and replacing the coolant liquid with fresh coolant from a source maintained at predetermined temperature that body heat is lost by all individuals at substantially maximum rate.

Summary of invention

In accordance with this invention, the shrimp are immersed in a shallow bath of coolant which is confined in a channel along which the shrimp are made to advance progressively from an input point to an output point. Coolant in the bath is continuously and rapidly withdrawn therefrom at locations distributed throughout the length of the channel between such points for return of the coolant to a refrigerating means having sufficient capacity to refrigerate the coolant to predetermined temperature regardless of thermal load variations in the system and return it to the bath. Coolant being returned to the bath from the refrigerating device is continuously jetted forcibly against the surface of the bath at a large number of locations distributed across the breadth and length of the bath at a total rate which is substantially equal to the rate of withdrawal and which thereby maintains the level of the bath preferably slightly above the level necessary to insure immersion of all individual shrimp.

Additional features of the invention lie in the preferred embodiment wherein the flow channel comprises the lower peripheral portion of an inclined revolving cylindrical drum having a large number of drain openings in the wall thereof distributed along its length and about its periphery. Force jets of coolant beating down on the surface of the shallow bath which they maintain in the drum at a depth attaining equilibrium between drainage rate and supply rate of coolant, have a multifold effect. Being directed as they are generally transversely to the surface of the bath and to the underlying apertured wall of the drum, these jets so vigorously sweep the chilled coolant downwardly and past the physically confined shrimp such that, coupled with the very brief dwell time of coolant within the bath before its exit through the drainage openings, all individuals are exposed to coolant at substantially constant temperature. Secondly, any tendency of individuals to surface is countered by the force of the jets plunging them back beneath the surface repeatedly so as to maintain an effective continuous state of immersion of all individuals. Thirdly, the widespread distribution of these jets over the length and width of the agitated bath effectively levels out the shrimp into a relatively uniform state of distribution and thus avoids any tendency for bunching up which could impair uniformity of freezing rates throughout the bath. Finally, by revolving the drum so as to effect relative motion of the apertured channel surface in which the bath is confined the jets create a constantly changing pattern of deflection currents in the bath by reason of the changing relationship between points of impact of the jets and underlying relative locations of apertures in the drum wall. These changing current patterns add further to the uniformity of treatment of all individuals and assure against any tendency of openings to be clogged by individual shrimp.

A spiral feed element formed along the length and periphery of the drum's interior assures positive advance of the shrimp along the flow channel should the unit be employed aboard a fishing vessel subject to pitching and rolling motion, whereas in stationary systems uniform feed rate through the drum may be achieved merely by reason of its longitudinal incline.

The expression "shallow bath" used herein with reference to the quantity of coolant confined by the lower peripheral portion of the drum is intended to mean a bath of such relative depth as to approach or slightly exceed that necessary to immerse the shrimp. Appreciably lesser depth produces problems of maintaining uniform exposure to coolant and uniform flow and distribution of shrimp in the drum. Excessive depth implies retention of coolant longer in the drum than is desirable in order to maintain constancy of temperature throughout the bath and also lessens the effectiveness of the jet flow to move the brine vigorously past all individual shrimp.

*Description of preferred embodiments*

The above and other features, objects and advantages of the invention will become more fully evident from the following description thereof by reference to the accompanying drawings.

FIGURE 4 is a side view, partly in cross section, of a modified form of drum incorporating a feed screw therein for advancing the shrimp in positive manner.

Figure 1:
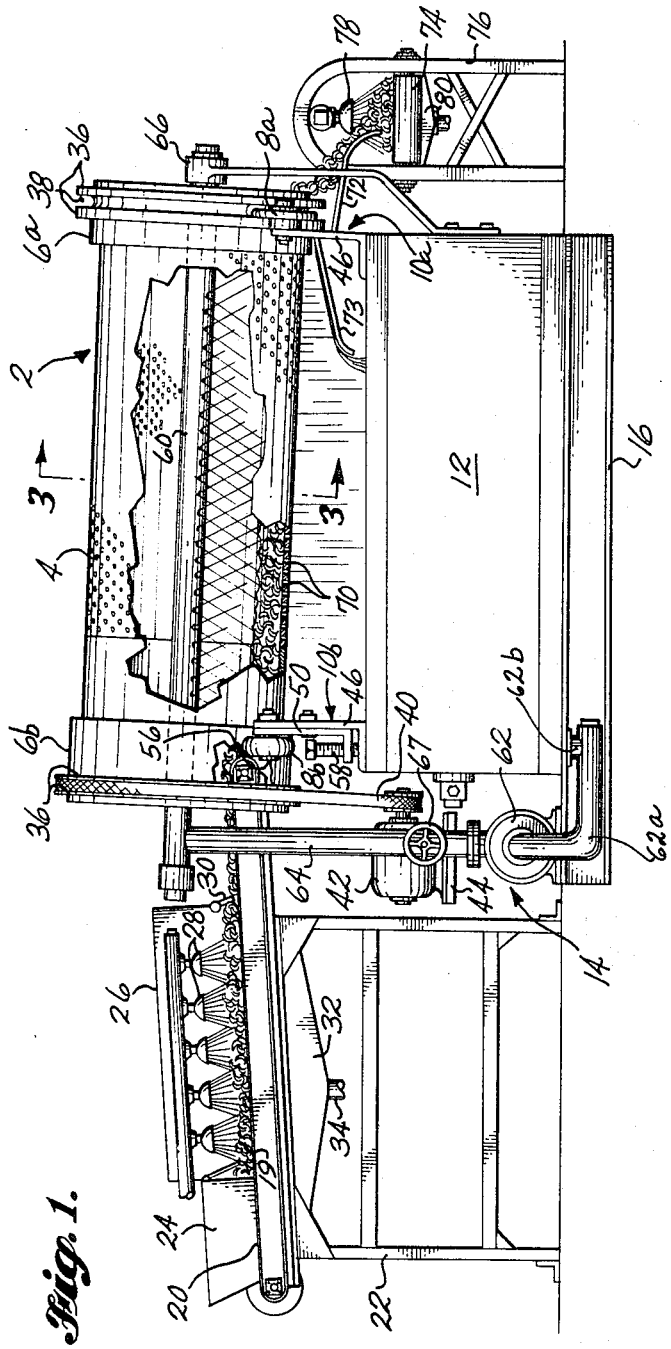
FIGURE 1 is a side elevation of apparatus for carrying out the invention in a perforated drum, with parts of the apparatus removed to illustrate interior elements of the same.
Figure 1:
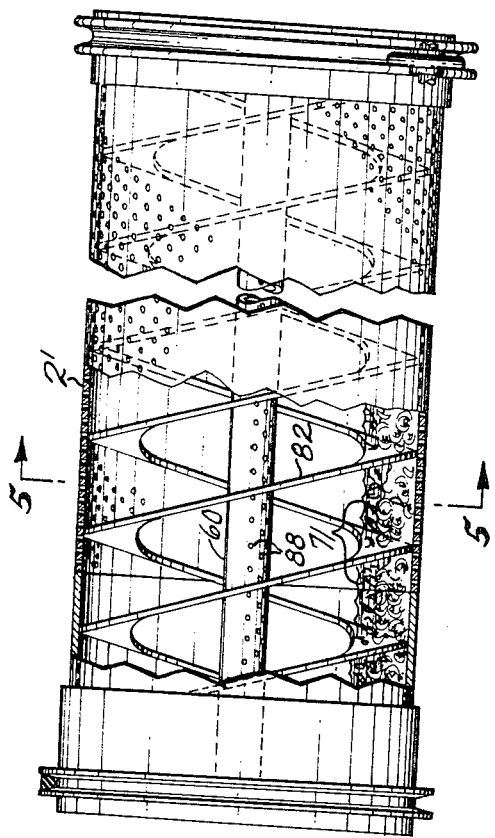
Figure 2:
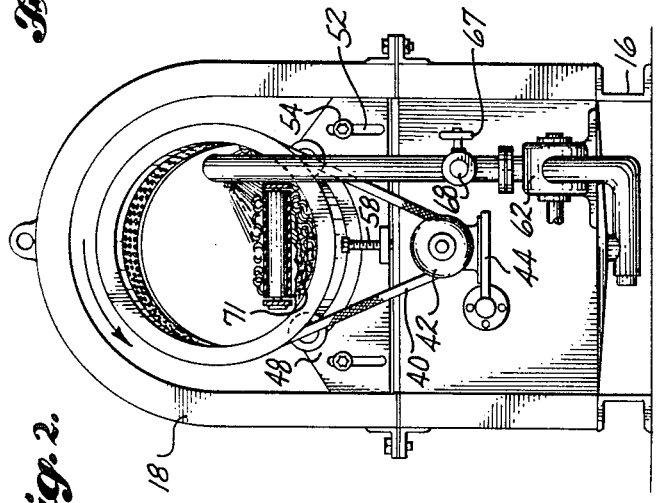
FIGURE 2 is an end elevation of the freezing apparatus, with the conveyor by which the shrimp are fed to the freezer drum being shown in cross section.
Figure 3:
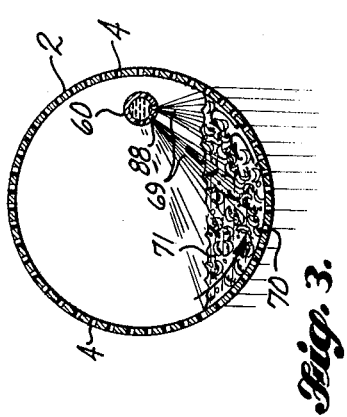
FIGURE 3 is a cross-sectional view through the drum taken along line 3—3 in FIGURE 1.

As shown in FIGURES 1-3, inclusive, the system comprises a hollow cylindrical drum 2 formed by an elongated foraminous tubular sleeve 4 joined at opposite ends to annular collars 6a and 6b. Collar 6a has longitudinally spaced peripheral flanges 36 defining a circumferential groove 38 between them. Flange 6b is of generally similar construction. Bearing wheels 8a keyed into groove 38 are journaled rotatively on a saddle block 10a above the adjacent end of tank 12 to provide a rotational thrust-bearing support for the associated end of the drum. A pair of transversely spaced rollers 8b rotationally mounted on a saddle block 10 above the opposite end of the tank 12 engage opposite sides of the collar 6b so as to provide a cradling rotational support for that end of the drum as well supporting it at a height slightly above the opposite end. Each of the saddle blocks comprises an upright plate 46 having a concave upper edge which accommodates the convexity of the drum. Bearing wheels 8b are mounted on angle brackets 50 carried by the flange 46 of saddle 10b so as to permit raising and lowering these wheels adjustably and thereby varying the inclination angle of the drum 2. Such elevational adjustment of wheels 8b may be effected by turning of the bolt 58 threaded in the lower flange of the angle bracket 50 and bearing downwardly against the lower flange of the saddle block 10b. Clamp bolts 54 may then be tightened to hold the angle bracket 50 securely in any such adjusted position. Clamp bolts 54 are fixed in flange 46 while being free to slide in vertical slots 32 in the angle bracket 50 (FIGURE 2). Similar vertical slots in the upright flange 46 of saddle block 10b allow vertical adjustment of rollers 8b on stub shafts 56 which stub shafts are secured to angle bracket 50.

Ribs 36 on collar 6b form a drum-encircling pulley which is engaged by a V-belt 40 of a drive mechanism for revolving the drum slowly about its longitudinal axis on the sets of cradling wheels 8a and 8b. The drive mechanism includes an electric motor 42 (preferably of a variable-speed type) mounted on a belt-tensioning hinged support 44 located adjacent the end of tank 12 underlying the input end of the drum.

Tank unit 12 incorporates a suitable refrigeration unit including a reservoir space for liquid coolant (e.g. brine or equivalent liquid having a freezing point below that of fresh water) and appropriate heat exchange coils or other means (not shown) for refrigerating the brine to the desired quick freeze temperature of the system. For purposes of the invention, however, any suitable apparatus, conventional or otherwise, may be used for maintaining a constant supply of chilled coolant at predetermined temperature available to be discharged into the interior of the quick freeze drum 2 in the described system. The foraminous sleeve portion 4 of the drum is disposed directly above the open top of the tank 12 so that drainage of coolant through the drum's drain openings 70 runs directly into the tank for rechilling and ultimate recirculation to the drum. Brine from the tank is delivered to the drum by a pumping system including the centrifugal pump 62, a pump intake pipe 62a connected at 62b to the bottom of the tank 12 and the riser pipe 64 leading upwardly from the outlet of the pump 62 to the elongated multiply apertured plenum pipe 60 which extends lengthwise throughout the length of the drum interior as shown. A throttle control valve 68 in the riser pipe 64 permits adjustment of the flow rate of the brine circulated from the tank 12 to the plenum 60 for forcible discharge through the latter's many apertures 88 into the interior of the lower peripheral portion of the drum, and ultimate return to the tank 12. The tank is supported on raised footing channels 16 to accommodate the pipe 62a in its connection to the tank bottom as shown. The closed end of plenum pipe 60 opposite the riser 64 is supported on a bracket 66 fastened to the underlying end wall of the tank 12 as shown.

Shrimp 19 or other food bodies to be quick-frozen are fed into the open input end of drum 2 by a motor-driven belt conveyor 20 which is supported on a stand 22 placed adjacent the tank. The belt is suitably supplied with shrimp manually or by a mechanical feeder (not shown) delivering into a hopper 24 or other means for spreading the shrimp more or less uniformly on the belt's surface. The belt moves the shrimp through a tunneled enclosure 26 which is equipped with a bank of spray nozzles 28 for spraying the shrimp. These nozzles are connected to spray the shrimp with fresh water prechilled to a temperature slightly above freezing so as to cool the shrimp more or less uniformly to a temperature slightly above freezing and thereby close the pores of the meat against subsequent penetration of brine. The shrimp leave the end of the conveyor belt 20 and drop into the brine bath maintained in the inclined drum 2. Moderate variations in rate at which the shrimp are fed to the freezer drum 2 by conveyor 20 are largely eliminated by passing the belt 20 beneath an adjustable leveling flap or gate 30 located at the exit of enclosure 26. Drainage from belt 20 runs into a collecting basin 32 which has an outlet 34 leading to a fresh water refrigeration unit (not shown) connected to circulate the fresh water, with appropriate filtering, in a path including the nozzles 28.

Preferably the longitudinally extending plenum pipe 60 is located generally intermediate the drum's axis and the upwardly moving side of the drum. The many apertures or orifices 88 in this plenum are distributed along its length and about its lower periphery so as to direct many jets 69 of chilled brine downwardly and forcibly against the confining lower peripheral surface of the drum. Pressure maintained in the plenum 60 by the pump 62 produces such a rate of downpouring of coolant into the flow channel defined by the lower periphery of the drum as to reach equilibrium with the rapid rate of drainage from the drum with the level of coolant accumulated sufficiently to form a shallow bath in the drum along most of its length. It will be appreciated that the point of this equilibrium, hence the bath's depth, may readily be adjusted or regulated in any of different ways, perhaps the simplest being by means of the throttle valve 68. Offsetting of the nozzle plenum pipe 80 toward the upturning side of the drum 2 is not critical but has the desirable effect of directing the coolant jets with somewhat greater force against the surface of the bath adjacent the upwardly moving side of the drum at transverse obliques to the bath's surface at such location so as to overcome any tendency of shrimp to concentrate at that location because of drum rotation, or even to ride up the side of the drum out of the bath. In general, however, it is desirable to pattern the jet flow so as to pummel the surface of the bath with coolant in substantially all areas of the bath occupied by the shrimp so as to provide the desirable effects of the jets in submerging any shrimp tending to surface, helping to level out and thus more evenly distribute the shrimp throughout the area of the bath in transit through the drum and produce such agitation and vigorous stirring of brine in contact with the shrimp as to avoid formation of any zones or regions in which temperature is permitted to drift locally above the desired freezing temperature for the brine. Because the bath is kept relatively shallow and the shrimp are confined by the channel-forming surface represented by the perforated lower peripheral portion of the drum, there is a very rapid turnover of brine so that a uniform freezing action is applied to all individuals. Rotation of the drum causes changing current patterns in the bath, and by its motion relative to the mass of shrimp thereon helps eliminate any "friction" effects so as to insure steady flow of shrimp along the incline of the drum, and unencumbered drainage of coolant out the drain openings 70.

As the shrimp reach the discharge end of the drum they flow onto an apron 72. Some brine may also run out onto this apron, but at that point most has drained back into the vat 12 directly or by deflection on the inwardly directed apron 73. Apron 72 discharges the shrimp onto an off-bear belt conveyor 74 mounted on a stand 76, whereon the shrimp are rinsed of salt by a fresh water spray from a bank of nozzles 78. Such rinse water is collected in the basin 80 and discharged outside the system.

Figure 5:
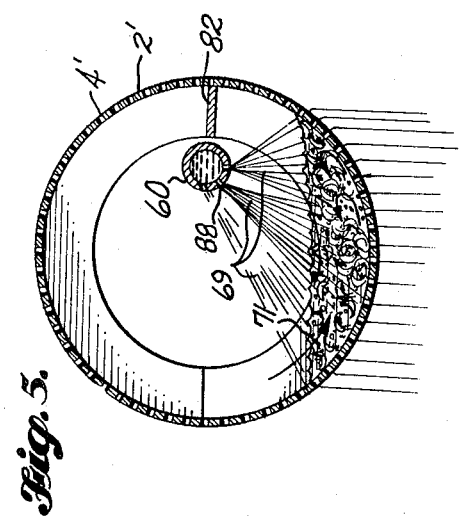
FIGURE 5 is a cross-sectional view taken on the line 5—5 in FIGURE 4.

In shipboard applications, for example, pitching and rolling of the vessel changing the inclination angle of the freezer drum would vary the effective cycle time of shrimp in the drum and thereby impair uniformity of the frozen product. Therefore, for such applications it is desirable to provide a more positive means controlling rate of advance of the shrimp along the length of the drum. The embodiment shown in FIGURES 4 and 5 incorporates such a means which in this instance comprises an elongated spiral rib or screw element 82 extending the length of the drum 2' around the interior periphery thereof. In effect, this spiral element 82 divides the coolant bath maintained in the bottom of the drum into a series of separate compartments which advance progressively lengthwise of the drum as the drum rotates.

In a typical application of the invention the shrimp, anchovies, or other food bodies to be quick-frozen are supplied to belt 20, prechilled by fresh water to a substantially uniform temperature of the order of 38° F. and delivered to the inlet end of the freezer drum 2 at a rate which will be determined by variable requirements and design specifications of the system. For example, in a typical installation suitable for shipboard use approximately 20 pounds of shrimp per minute may be metered into the drum, to which brine at subfreezing temperature is applied in a manner and at a rate which achieves the described conditions in the drum. The required duration of the freezing cycle may vary but generally need not exceed about one minute, which is materially less than with prior systems.

While the invention has been described with reference to preferred embodiments thereof, it will be understood that various changes and additions may be made therein without departing from the scope and spirit of the essential features involved.

I claim as my invention:

1. Apparatus for quick freezing of shrimp and similar food bodies, comprising an elongated channel means having a confining surface upon which shrimp may be deposited to be moved progressively along said channel, said surface having numerous drain openings therein distributed substantially uniformly over the area thereof occupied by the shrimp, a source of chilled coolant liquid, an operatively associated means for directing a continuous flow of coolant liquid from said source against said surface substantially throughout the occupied area thereof at such rate as to form a shrimp-immersing shallow bath of coolant in the channel means overlying said drain openings, said operatively associated means including elements operable to jet the coolant at the bath at a large number of locations distributed over the occupied area and with sufficient force substantially so as to submerge any surfacing shrimp, to level out and thereby distribute the shrimp in the bath, and to circulate coolant vigorously past individual shrimp, and means returning coolant escaping through the drain openings back to the source for rechilling.

2. The apparatus defined in claim 1, further comprising means maintaining the confining surface at a longitudinal incline to effect progressive movement of the shrimp therealong by gravity flow, and means operatively connected with the surface to move the same in a direction of its extent so as to vary the relationship of the drain openings in the surface and the relative locations of the coolant jets.

3. The apparatus defined in claim 2, wherein the channel means comprises the lower peripheral portion of an elongated multiply perforated generally cylindrical drum, and wherein the operatively connected means revolves the drum unidirectionally about its longitudinal axis.

4. The apparatus defined in claim 3, wherein the drum has a spiral member extending around its interior periphery and along its length to advance the shrimp positively lengthwise of the drum by rotation thereof.

5. The apparatus defined in claim 3, wherein the operatively associated means comprises a plurality of jet orifices and means positioning such orifices in distributed positions along the drum's length along a region generally intermediate the drum's axis and its upwardly moving side.

6. In a continuous-flow process for quick freezing of shrimp and other food bodies by immersion in refrigerated liquid in an elonated bath-defining enclosure which is connected in circuit with means to refrigerate the liquid and to recirculate the same continuously through the bath, the steps of immersing the shrimp or other food bodies in freely suspended state in the bath generally at one end thereof and advancing the same so immersed progressively endwise of the bath, rapidly and continuously draining the bath at numerous locations distributed along the enclosure substantially throughout the length and breadth of the bath for return of such liquid to the refrigerating means, continuously jetting refrigerated liquid supplied by said refrigerating means into the bath in transverse relation to the breadth and length of the bath at numerous locations situated generally across the bath from the drain locations and also distributed generally across the breadth and length of the bath, whereby the immersed shrimp or other food bodies in transit are subjected to a rapid turnover of refrigerated liquid induced to flow vigorously transversely through the bath both by the action of the transverse jetting and by the transverse flow to drainage, the total rate of input of refrigerated liquid being substantially equal to the total withdrawal rate thereof from the enclosure so as to maintain the bath's volume.

7. The process defined in claim 6, further comprising the step of substantially continuously shifting the drain locations in relation to the jetting locations, such shifting occurring in a direction generally transverse to the thickness of the bath.

8. Continuous-flow apparatus for quick-freezing of shrimp and other food bodies, comprising a refrigerated liquid source of regulated output temperature, enclosure means to confine refrigerated liquid in an elongated bath, means in association with said enclosure means by which masses of shrimp or other food bodies are introduced into the bath in a state of free suspension at one end thereof and are advanced in a state of immersion progressively endwise of the bath for eventual discharge therefrom, liquid input means connected to receive refrigerated liquid supplied from the source and operable for jetting such liquid into the bath in transverse relation to the length and breadth thereof at numerous locations distributed generally over the length and breadth of the bath, liquid drainage means with a return connection to the source and arranged for withdrawing liquid from the bath at numerous locations distributed generally over the length and breadth of the bath, the rates of liquid input and drainage substantially maintaining the bath's volume while producing rapid turn-over replacement of bath liquid by refrigerated source liquid.

9. The combination defined in claim 8, wherein the enclosure means comprises an elongated hollow tubular member disposed generally horizontally and confining the bath within the lower wall portion of such member, wherein the drainage means comprises numerous openings distributed lengthwise and circumferentially in the tubular member, and wherein the liquid input means comprises conduit means carrying refrigerated liquid lengthwise in the tubular member to nozzle means distributed lengthwise of the interior of the tubular member in a region generally overlying said lower wall portion, said nozzle means being directed generally downward into the bath at numerous locations distributed generally across the length and breadth of the bath.

10. The combination defined in claim 9, and means to rotate the tubular member about the longitudinal axis thereof while shrimp or other food bodies are in transit through the bath.

11. The combination defined in claim 10, further comprising a spiral member extending around the interior surface and lengthwise of the tubular member, said spiral member being connected to rotate with the tubular member about the latter's axis so as to advance the shrimp or other food bodies by screw action.

References Cited

UNITED STATES PATENTS

| | | | |
|---|---|---|---|
| 2,332,367 | 10/1943 | Birdseye | 62—64 X |
| 2,920,462 | 1/1960 | Roser et al. | 62—374 |
| 3,060,701 | 10/1962 | Durand | 62—64 X |
| 3,240,026 | 3/1966 | Van Dolah et al. | 62—64 X |

ROBERT A. O'LEARY, *Primary Examiner.*

W. E. WAYNER, *Assistant Examiner.*